(12) United States Patent
Santillon (10) Patent No.: US 12,293,681 B2
(45) Date of Patent: May 6, 2025

(54) SCRATCH PAD AND INK

(71) Applicant: Plus Brand Industries Inc., Sheridan, WY (US)

(72) Inventor: Moises Santillon, Riverside, CA (US)

(73) Assignee: Plus Brand Industries Inc., Sheridan, WY (US)

( * ) Notice: Subject to any disclaimer, the term of this patent is extended or adjusted under 35 U.S.C. 154(b) by 223 days.

(21) Appl. No.: 17/835,405

(22) Filed: Jun. 8, 2022

(65) Prior Publication Data

US 2023/0401981 A1     Dec. 14, 2023

(51) Int. Cl.
| | |
|---|---|
| *G09F 3/00* | (2006.01) |
| *B41M 1/04* | (2006.01) |
| *B41M 3/14* | (2006.01) |
| *B41M 5/124* | (2006.01) |
| *C09D 11/101* | (2014.01) |
| *G09F 19/12* | (2006.01) |

(52) U.S. Cl.
CPC .............. *G09F 3/0291* (2013.01); *B41M 1/04* (2013.01); *B41M 3/14* (2013.01); *B41M 5/124* (2013.01); *C09D 11/101* (2013.01); *G09F 19/12* (2013.01)

(58) Field of Classification Search
CPC ....... B41M 3/14; B41M 5/124; C09D 11/101; G09F 3/0291; G09F 19/12
See application file for complete search history.

(56) References Cited

U.S. PATENT DOCUMENTS

| | | | | |
|---|---|---|---|---|
| 5,532,046 A | * | 7/1996 | Rich | ...................... A63F 3/0665 428/209 |
| 5,830,529 A | | 11/1998 | Ross | |
| 6,232,361 B1 | | 5/2001 | Laksin et al. | |
| 6,902,198 B2 | | 6/2005 | Hoang | |
| 2004/0157046 A1 | | 8/2004 | Becker et al. | |
| 2005/0153091 A1 | * | 7/2005 | Challoner | .................. G09F 3/10 428/42.3 |
| 2008/0113862 A1 | | 5/2008 | Stovold et al. | |
| 2012/0010895 A1 | | 1/2012 | Versteeg | |
| 2016/0340529 A1 | | 11/2016 | Lawrence | |
| 2019/0030420 A1 | * | 1/2019 | Tzomik | .................. B41M 3/005 |
| 2020/0282298 A1 | * | 9/2020 | Tevis | .................... B42D 15/025 |

FOREIGN PATENT DOCUMENTS

| | | | | |
|---|---|---|---|---|
| WO | WO-2010130041 A1 | * | 11/2010 | ........... A63F 3/0665 |
| WO | 2017182064 | | 10/2017 | |

OTHER PUBLICATIONS

Teslin Digital 1000 product information acquired from ULTRUS at https://www.ulprospector.com/plastics/en/datasheet/276725/teslin-digital-1000 on Jul. 10, 2024.*

Cosmofilms, Uses and Attributes of Bopp Films—Its Pros and Its Cons, BOPP Films Manufacturers and Supplier, https://www.cosmofilms.com/blog/uses-and-attributes-of-bopp-films-its-pros-and-its-cons/.

International Search Report and Written Opinion for PCT/US22/44333 mailed Feb. 15, 2023.

* cited by examiner

*Primary Examiner* — Gerard Higgins

(74) *Attorney, Agent, or Firm* — Clark Hill PLC; Timothy M. McCarthy; William Cramer (57) ABSTRACT

A scratch-off coating is provided which includes a first layer of ink comprised of a water-based ink; and a second layer of ink comprised of an ultraviolet-cured ink layered over said first layer of ink, wherein upon application of a scratching force said first layer of ink and said second layer of ink are removable from a surface on which said first layer of ink and said second layer of ink are applied.

24 Claims, 5 Drawing Sheets

SCRATCH PAD AND INK

BACKGROUND OF THE INVENTION

The present invention generally relates to an improved scratch off ink, an article having the improved scratch-off ink printed on a portion of the article, and a method of manufacturing the same. More particularly, the present invention relates to an article having a scratch-off ink portion, where a scratching force applied to the scratch-off ink removes the scratch-off ink, revealing a contrasting color below the scratch-off ink and allowing a user to make visible marks on the article.

Scratch-off inks have been used for the purpose of marking an object using a scratching force. Scratch-off inks are also commonly used for concealing prizes on lottery tickets, PIN numbers on gift cards, and sensitive information on documents. Various inks have been designed to be able to be scratched away from a surface on which it was printed and reveal information or a contrasting color under the ink. These inks have varied from solvent-based inks to water-based inks to ultraviolet-light-cured inks.

One scratch-off label is disclosed by Griffin, U.S. Pat. No. 5,154,448A. The Griffin device provides a base material and a second material having a contrasting color to the base material coated over a portion of the base material. The second material is removable when scratched, allowing a user to make legible marks on the label through scratching. The Griffin device uses only one layer of scratch-off material and does not use any specific materials that would provide water or rub resistance to the scratch-off ink.

One scratch-off game article is disclosed by Finnerty, U.S. Ser. No. 10/130,869B2. The Finnerty article provides a document comprising a substrate, a release material on the substrate, and at least one scratch-off coating applied over the release coating on the substrate. The scratch-off coating is removable by a scratching force, allowing a user to reveal content below the scratch-off coating. The Finnerty device uses only one layer of scratch-off material and does not use any specific materials that would provide water or rub resistance to the scratch-off ink.

One scratch-off ink is disclosed by Carrick, U.S. Pat. No. 5,215,576A. The Carrick ink is comprised of an acrylic resin in an aqueous medium, a pigment, and a powder filler. The Carrick ink does not address the issue of adhering to a surface with low surface energy while still maintaining water and rub resistance and the ability to be easily removed with a scratching force.

BRIEF SUMMARY OF THE INVENTION

One or more of the embodiments of the present invention provide an improved scratch-off ink, scratch-off labels including the improved scratch-off ink, and a method of making the improved scratch-off ink and labels. The improved scratch-off ink includes an ultraviolet-cured ink layer printed over a layer of water-based ink. The improved scratch-off ink labels include the improved scratch-off ink printed onto a polymer laminate layer. The improved scratch-off ink is removable upon application of a scratching force. When a scratching force is applied and the improved scratch-off ink is removed, a color contrasting to that of the improved scratch-off ink is exposed, thus allowing a user to make visible marks through a scratching force with an object such as a fingernail.

DETAILED DESCRIPTION OF THE INVENTION

While the invention may be subject to embodiment in different forms, there is shown in the drawings, and herein will be described in detail, specific embodiments with the understanding that the present disclosure is to be considered an exemplification of the principles of the invention and is not intended to limit the invention to that as illustrated and described herein.

One intended use of the invention is for beverage containers, including but not limited to bottles, cans, and cups, whether used for transportation of a beverage or consumption of a beverage or both. A need exists for a scratch pad for beverage containers that stands up to all the various situations that beverage containers encounters, including but not limited to water, ice, condensation, transport, heat, sunlight, and mild rubbing. For example, a water bottle comprising a scratch pad of the present invention can have the user's name, initials, nickname, avatar, or other identifier onto the scratch pad to identify that particular water bottle with that user. The scratch may be applied by the user or by a server. The scratch pad of the present invention may similarly be used on food or product packaging, on luggage, or other uses.

Figure 1:
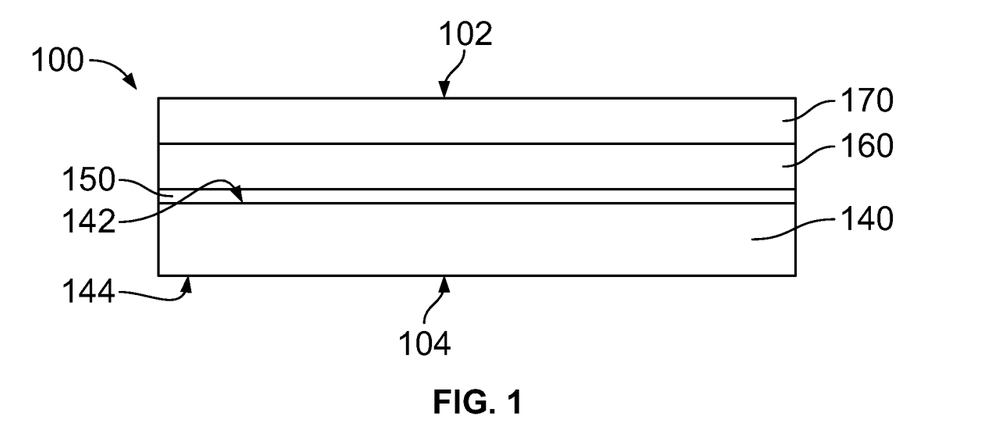
FIG. 1 illustrates a cross-sectional view of a scratch pad according to an embodiment of the present invention.

FIG. 1 illustrates a cross-sectional view of a scratch pad 100 according to an embodiment of the present invention. Scratch pad 100 has a top surface 102 and a bottom surface 104. Scratch pad 100 includes a polymer film layer 140, a water-based ink layer 160, and a UV ink layer 170. Polymer film layer 140 has a top surface 142 and a bottom surface 144. Water-based ink 160 and the UV ink layer 170 in combination are preferably opaque or translucent.

In some embodiments, polymer film layer 140 is a product to which scratch pad 100 is applied. For example, polymer film layer 140 may be a bottle, can, or any other food or beverage container. In these embodiments, top surface 102 is the outside of the bottle, can, or other container and bottom surface 104 is the inside of the bottle, can, or other container. In some of these embodiments, then, release coating 150 is applied to the bottle, can, or other food container.

Release coating 150 is thinly coated onto top surface 142 of polymer film layer 140 (either by the manufacturer of scratch pad 100 or by the manufacturer of the polymer film that comprises polymer film layer 140). Water-based ink layer 160 is coated onto release coating 150. UV ink layer 170 is coated onto water-based ink layer 160.

In operation, a scratching force may be applied to the surface of UV ink layer 170. The scratching force removes UV ink layer 170 and water-based ink layer 160 from polymer film layer 140 containing release coating 150 in the area in which the scratching force is applied. The scratching and removing of UV ink layer 170 and water-based ink layer 160 reveals polymer film layer 140.

UV ink layer 170 and water-based ink layer 160 are strongly adhered to one another. The strong adhesion between UV ink layer 170 and water-based ink layer 160 results in both UV ink layer 170 and water-based ink layer 160 remaining adhered to one another and being removed from polymer film layer 140 in the area in which the scratching force is applied.

Release coating 150, whether applied by the manufacturer of scratch pad 100 or by the manufacturer of polymer film layer 140, has low surface energy, resulting in reduced adhesion between water-based ink layer 160 and the surface of polymer film layer 140 containing the release coating 150. When the scratching force is applied to the top surface of UV ink layer 170, the scratching force is transferred through UV ink layer 170 to water-based ink layer 160. The reduced adhesion between water-based ink layer 160 and polymer film layer 140 results in water-based ink layer 160 and UV ink layer 170 being removed from polymer film layer 140 in the area in which the scratching force is applied without a large amount of scratching force being applied. The amount of scratching force necessary to remove UV ink layer 170 and water-based ink layer 160 from polymer film layer 140 can easily be applied by a fingernail or coin.

While the adhesion between water-based ink layer 160 and polymer film layer 140 is weak enough for water-based ink layer 160 to be removed from polymer film layer 140 upon the application of a relatively small amount of scratching force, the adhesion between water-based ink layer 160 and polymer film layer 140 is strong enough for water-based ink layer 160 to remain adhered to polymer film layer 140 when a moderate amount of rubbing force is applied to UV ink layer 170 by a dull object. A human finger rubbing across UV ink layer 170 will not remove water-based ink layer 160 from polymer film layer 140 without a large amount of rubbing force being applied.

UV ink layer 170 is not readily water soluble. UV ink layer 170 coated over water-based ink layer 160 provides a water-resistant coating, preventing UV ink layer 170 and water-based ink layer 160 from being removed from and exposing polymer film layer 140 below when the scratch pad 100 comes into contact with water such as sweat, condensation, or rain, or with other solvates.

In certain embodiments of the present invention, polymer film layer 140 is comprised of a thermoplastic polymer.

In certain embodiments of the present invention, polymer film layer 140 is comprised of a synthetic polymer material, such as polypropylene, polyester, vinyl, polystyrene or polyolefin.

In certain embodiments of the present invention, the release coating 150 is comprised of a low-surface-energy material, such as one or more of a silicone compound, a surfactant, and a wax.

In certain embodiments of the present invention, water-based ink layer 160 is a high-opacity water-based ink, including by way of example and not by way of limitation an opaque white water-based ink or any other color.

In certain embodiments of the present invention, UV ink layer 170 is a high opacity ultraviolet-light-cured ink, including by way of example and not by way of limitation a white UV-light-cured ink, or any other color.

In certain embodiments of the present invention, graphics are printed on polymer film layer 140.

In certain embodiments of the present invention polymer film layer 140 has a color that is contrasting to the combined color of UV ink layer 170 and water-based ink layer 160.

In certain embodiments of the present invention polymer film layer 140 is transparent and polymer film layer 140 is applied to a surface having a color that is contrasting to the combined color of UV ink layer 170 and water-based ink layer 160.

In certain embodiments of the present invention, water-based ink layer 160 is not included in the scratch pad 100, and UV ink layer 170 is adhered to polymer film layer 140.

In certain embodiments of the present invention, release coating 150 is a coating applied to polymer film layer 140 by the manufacturer of polymer film layer 140. In some embodiments, release coating 150 is applied to polymer film layer 140 by the manufacturer of polymer film layer 140 to reduce the adhesion of polymer film layer 140 to itself when polymer film layer 140 is rolled into a roll.

In certain embodiments of the present invention, polymer film layer 140 is replaced with aluminum, glass or plastic. In such embodiments water-based ink layer 160 and UV ink layer 170 are printed directly onto an object such as a food or beverage container.

Figure 3:
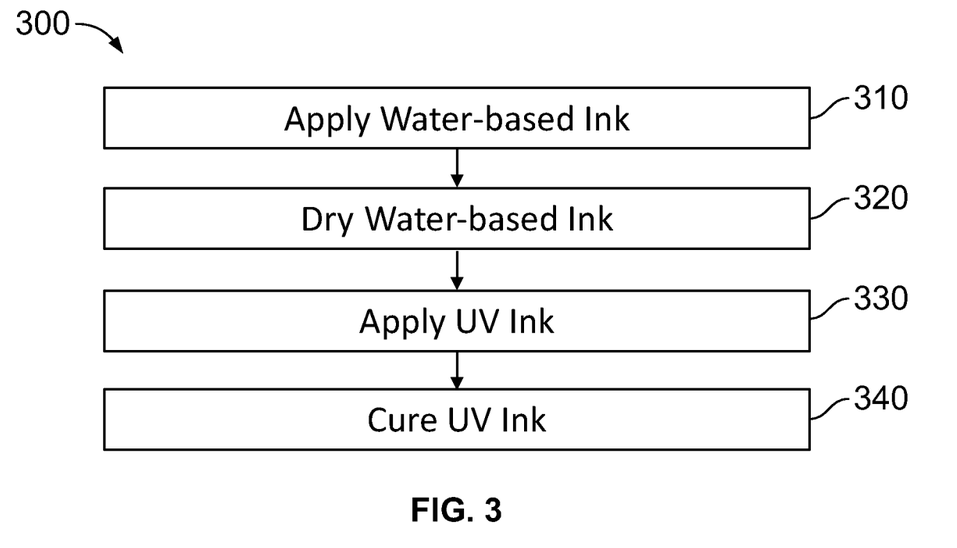
FIG. 3 illustrates a flowchart of an embodiment of a process for making the scratch pad of FIG. 1.

FIG. 3 illustrates a flowchart 300 of an embodiment of a process for making scratch pad 100. Scratch pad 100 is preferably made on a flexographic printing machine but may be made on any other type of printer.

First, at step 310, water-based ink layer 160 is printed on polymer film layer 140. In embodiments in which polymer film layer 140 has release coating 150 applied, water-based ink layer 160 is printed onto release coating 150; otherwise water-based ink layer 160 is printed directly onto top surface 142. Next, at step 320, water-based ink layer 160 is dried. Next, at step 330, UV ink layer 170 is printed over water-based ink layer 160. Next, at step 340, UV ink layer 170 is cured using ultraviolet light.

In certain embodiments of the present invention, polymer film layer 140 and release coating 150 are preassembled as a roll or sheet.

In certain embodiments of the present invention, a flexiblizer is added to water-based ink layer 160 before it is applied to polymer film layer 140 at step 310 to increase the flexibility of water-based ink layer 160.

In certain embodiments of the present invention, a flexiblizer is added to UV ink layer 170 before it is printed over water-based ink layer 160 at step 330 to increase the flexibility of UV ink layer 170.

In certain embodiments of the present invention, polymer film layer 140 is treated with a low-surface-energy material before water-based ink layer 160 is printed on polymer film layer 140 at step 310 to decrease the strength of adhesion between water-based ink layer 160 and polymer film layer 140.

In certain embodiments of the present invention, polymer film layer 140 is treated with additional release coating 150 before water-based ink layer 160 is printed on polymer film layer 140 at step 310 to decrease the strength of adhesion between water-based ink layer 160 and polymer film layer 140.

In certain embodiments of the present invention, the amount of release coating 150 on polymer film layer 140 is reduced before water-based ink layer 160 is printed on polymer film layer 140 at step 310 to increase the strength of adhesion between water-based ink layer 160 and polymer film layer 140.

In certain embodiments of the present invention, an adhesion enhancing technique, such as surface oxidation, electrical (corona) discharge, flame plasma, atmospheric plasma, cold-gas plasma, UV radiation-ozone and Pyrosil flame treatment, is applied to polymer film layer 140 before step 310 to increase the adhesion of water-based ink layer 160 to polymer film layer 140.

In certain embodiments of the present invention, steps 310 and 320 are removed from the process, and at step 330, UV ink layer 170 is layered onto polymer film layer 140 instead of being layered onto water-based ink layer 160.

Figure 2:
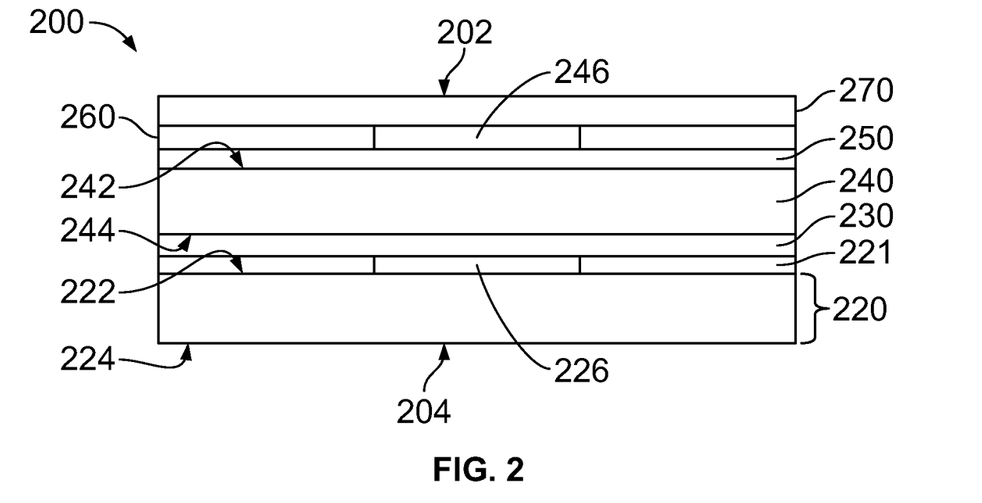
FIG. 2 illustrates a cross-sectional view of a scratch pad according to another embodiment of the present invention.

FIG. 2 illustrates a cross-sectional view of a scratch pad 200 according to another embodiment of the present invention. Scratch pad 200 has a top surface 202 and a bottom surface 204. Scratch pad 200 includes a substrate 220, a contrasting ink layer 221, a polymer film adhesive layer 230, a polymer film layer 240, a release coating 250, a water-based ink layer 260, and a UV ink layer 270. Substrate 220 has a top surface 222 and an opposing bottom surface 224. In some embodiments, substrate bottom surface 224 is scratch pad bottom surface 204. Polymer film layer 240 has a top surface 242 and an opposing bottom surface 244.

Contrasting ink 221 is printed onto all of or a portion 226 of top surface 222 of substrate 220. Substrate top surface 222 and polymer film layer bottom surface 244 are adhered together with polymer film adhesive layer 230. Release coating 150 is thinly coated onto polymer film layer top surface 242. Water-based ink layer 260 is printed onto all of or a portion 246 of polymer film layer top surface 242, such that water-based ink layer 260 is printed directly above portion 226. UV ink layer 270 is printed over water-based ink layer 260.

Polymer film layer 240 is transparent or translucent. The combination of UV ink layer 270 and water-based ink layer 260 is opaque or translucent. Contrasting ink layer 221 printed on portion 226 is preferably a color that is contrasting to the color of the combination of UV ink layer 270 and water-based ink layer 260.

In operation, a scratching force is applied to the surface of UV ink layer 270. The scratching force removes the layers of UV ink layer 270 and water-based ink layer 260 from the surface of polymer film layer 240 containing the release coating 250 in the area in which the scratching force is applied. The scratching and removing of UV ink layer 270 and water-based ink layer 260 reveals the contrasting color of contrasting ink 221 printed on the substrate 220 through transparent polymer film layer 240.

UV ink layer 270 and water-based ink layer 260 are strongly adhered to one another. The strong adhesion between UV ink layer 270 and water-based ink layer 260 results in both UV ink layer 270 and water-based ink layer 260 remaining adhered to one another and being removed from polymer film layer 240 in the area in which the scratching force is applied.

Release coating 250 has low surface energy, resulting in reduced adhesion between water-based ink layer 260 and polymer film layer 240. When the scratching force is applied to the top surface of UV ink layer 270, the scratching force is transferred through UV ink layer 270 to water-based ink layer 260. The reduced adhesion between water-based ink layer 260 and polymer film layer 240 results in water-based ink layer 260 and UV ink layer 270 being removed from polymer film layer 240 in the area in which the scratching force is applied without a large amount of scratching force being applied. The amount of scratching force necessary to remove UV ink layer 270 and water-based ink layer 260 from polymer film layer 240 can easily be applied by a fingernail or coin or sharp object.

While the adhesion between water-based ink layer 260 and polymer film layer 240 is weak enough for water-based ink layer 260 to be removed from polymer film layer 240 upon the application of a relatively small amount of scratching force, the adhesion between water-based ink layer 260 and polymer film layer 240 is strong enough for water-based ink layer 260 to remain adhered to polymer film layer 240 when a moderate amount of rubbing force is applied to UV ink layer 270 by a dull object. A human finger rubbing across UV ink layer 270 will not remove water-based ink layer 260 from polymer film layer 240 without a large amount of rubbing force being applied.

Because UV ink layer 270 is not readily water soluble, UV ink layer 270 coated over water-based ink layer 260 provides a water-resistant coating, preventing UV ink layer 270 and water-based ink layer 260 from being removed from, and exposing, polymer film layer 240 below when the scratch pad 200 comes into contact with water such as sweat, condensation, or rain, or with other solvates.

In certain embodiments of the present invention substrate 220 has a color that is contrasting to the color of the combination of UV ink layer 170 and water-based ink layer 160 layers. In such embodiments contrasting ink 221 may be excluded from the scratch pad 200.

In certain embodiments of the present invention, the substrate 220 is comprised of a material selected from: paper, polypropylene, polyester, vinyl, polystyrene, and polyolefin.

In some embodiments, substrate 220 is a product to which scratch pad 200 is applied. For example, substrate 220 may be a bottle, can, or any other food or beverage container. In these embodiments, top surface 222 is the outside of the bottle, can, or other container and bottom surface 224 is the inside of the bottle, can, or other container. In certain embodiments of the present invention, polymer film layer 240 is comprised of a thermoplastic polymer.

In certain embodiments of the present invention, polymer film layer 240 is comprised of a synthetic polymer material, such as polypropylene, polyester, vinyl, polystyrene or polyolefin.

In certain embodiments of the present invention, release coating 250 is comprised of a low-surface-energy material, such as one or more of a silicone compound, a surfactant, and a wax.

In certain embodiments of the present invention, water-based ink layer 260 is a high-opacity water-based ink, including by way of example and not limitation an opaque white water-based ink, or any other color.

In certain embodiments of the present invention, UV ink layer 270 is a high-opacity ultraviolet-light-cured ink.

In certain embodiments of the present invention, graphics are printed on polymer film layer 240.

In certain embodiments of the present invention, water-based ink layer 260 is not included in scratch pad 200, and UV ink layer 270 is adhered to polymer film layer 240.

In certain embodiments of the present invention, release coating 250 is a coating applied to polymer film layer 240 by the manufacturer of polymer film layer 240. In some embodiments, release coating 250 is applied to polymer film layer 240 by the manufacturer of polymer film layer 220 to reduce the adhesion of polymer film layer 240 with itself when polymer film layer 240 is rolled into a roll.

In certain embodiments of the present invention, polymer film adhesive layer 230 comprises a pressure-sensitive adhesive.

In certain embodiments of the present invention, graphics are printed on the substrate 220.

In certain embodiments of the present invention, bottom surface 224 of substrate 220 includes an adhesive.

In certain embodiments of the present invention, bottom surface 224 of substrate 220 includes an adhesive, and the adhesive is removably adhered to a carrier material comprised of a synthetic plastic film or a paper coated with a low-surface-energy material such as wax.

Figure 4:
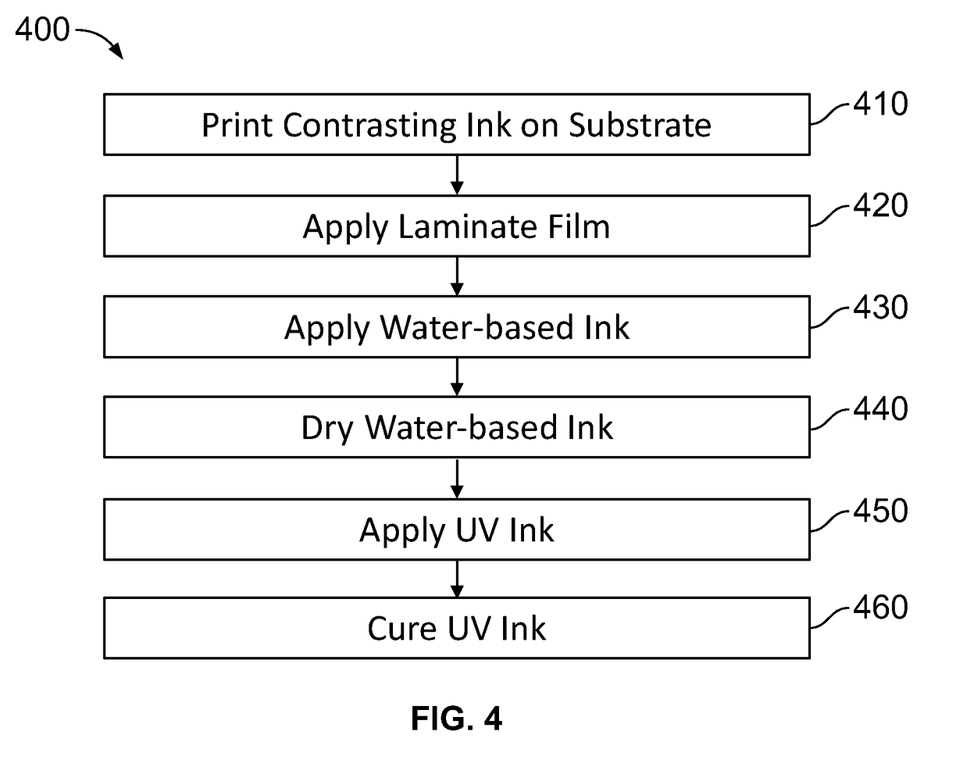
FIG. 4 illustrates a flowchart of an embodiment of a process for making the scratch pad of FIG. 2.

FIG. 4 illustrates a flowchart 400 of an embodiment of a process for making scratch pad 200. First, at step 410, contrasting ink 221 is printed onto substrate 220. Next, at step 420, bottom surface 244 of polymer film layer 240 is adhered to top surface 222 of substrate 220 with polymer film adhesive layer 230. Next, at step 430, water-based ink layer 260 is printed on polymer film layer 240. In embodiments in which polymer film layer 240 has release coating 150 applied, water-based ink layer 260 is printed onto release coating 150; otherwise water-based ink layer 260 is printed directly onto top surface 242.

Next, at step 440, water-based ink layer 260 is dried. Next, at step 450, UV ink layer 270 is printed over water-based ink layer 260. Next, at step 460, UV ink layer 270 is cured using ultraviolet light.

In certain embodiments of the present invention, polymer film layer 240 with polymer film adhesive layer 230 and release coating 150 is preassembled as a roll or sheet.

In certain embodiments of the present invention, a flexiblizer is added to water-based ink layer 260 before it is applied to polymer film layer 240 at step 440 to increase the flexibility of water-based ink layer 260.

In certain embodiments of the present invention, a flexiblizer is added to UV ink layer 270 before it is printed over water-based ink layer 260 at step 460 to increase the flexibility of UV ink layer 270.

In certain embodiments of the present invention, polymer film layer 240 is treated with a low-surface-energy material, such as release coating 250 or polymer layer 240, or similar material, before water-based ink layer 260 is printed on polymer film layer 240 at step 440 to increase the strength of adhesion between water-based ink layer 260 and polymer film layer 240.

In certain embodiments of the present invention, polymer film layer 240 is treated with additional release coating 250 before water-based ink layer 260 is printed on polymer film layer 240 at step 440 to decrease the strength of adhesion between water-based ink layer 260 and polymer film layer 240.

In certain embodiments of the present invention, the amount of release coating 250 on polymer film layer 240 is reduced before water-based ink layer 260 is printed on polymer film layer 240 at step 440 to increase the strength of adhesion between water-based ink layer 260 and polymer film layer 240.

In certain embodiments of the present invention, an adhesion enhancing technique, such as surface oxidation, electrical (corona) discharge, flame plasma, atmospheric plasma, cold-gas plasma, UV radiation-ozone and Pyrosil flame treatment, is applied to polymer film layer 240 before step 440 to increase the adhesion of water-based ink layer 260 to polymer film layer 240.

In certain embodiments of the present invention, steps 440 and 450 are removed from the process, and at step 460, UV ink layer 270 is layered onto polymer film layer 240 instead of being layered onto water-based ink layer 260.

Figure 5:
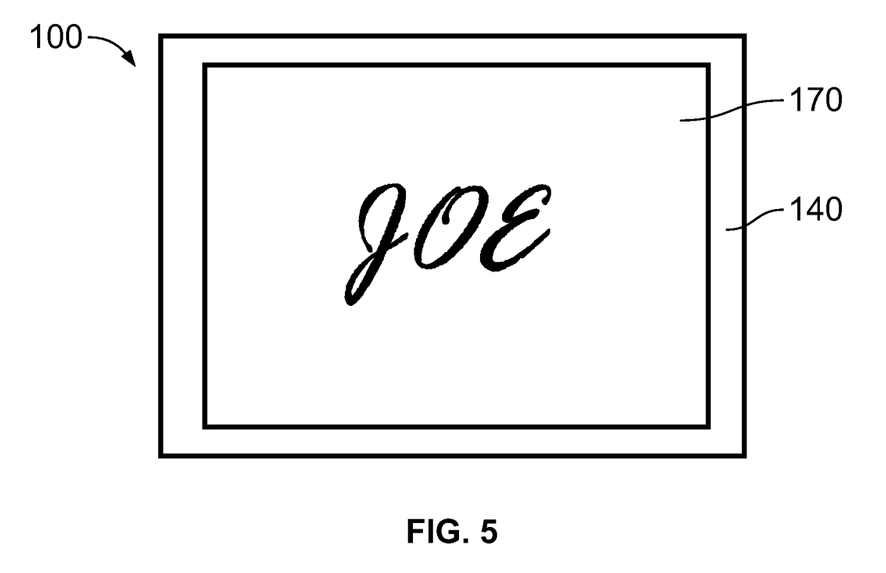
FIG. 5 illustrates a top view of a scratch pad according to an embodiment of the present invention.

FIG. 5 illustrates a top view of a scratch pad 100 according to an embodiment of FIG. 1. When an adequate scratching force is applied to water-the ink layer 160, water-based ink layer 160 and UV ink layer 170 are scratched off of polymer film layer 140. When water-based ink layer 160 and UV ink layer 170 are scratched off of polymer film layer 140, a contrasting color is revealed below water-based ink layer 160 and UV ink layer 170. Revealing the contrasting color below water-based ink layer 160 and UV ink layer 170 by applying a scratching force allows a user to visibly mark the scratch pad 100 with a sufficiently sharp implement, such as a fingernail or a coin or other sharp object.

Figure 6:
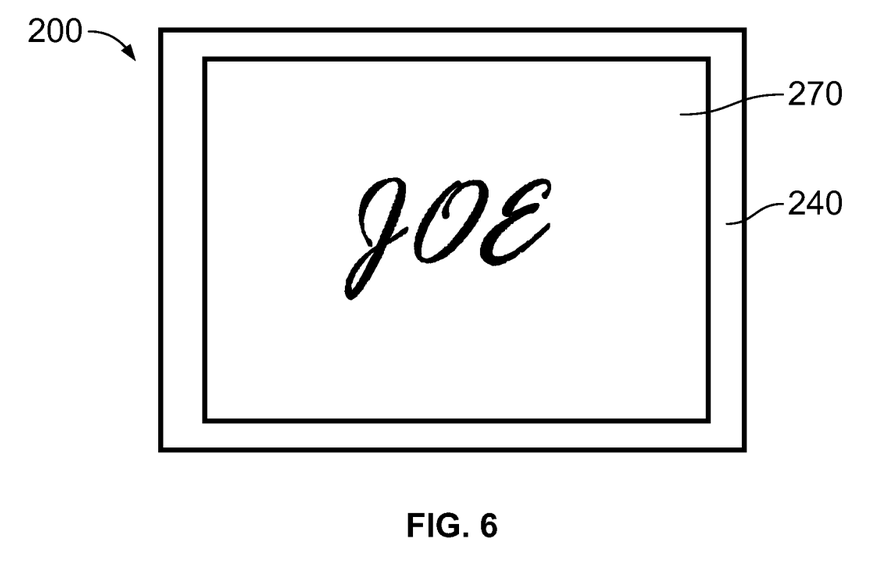
FIG. 6 illustrates a top view of a scratch pad according to yet another embodiment of the present invention.

FIG. 6 illustrates a top view of a scratch pad 200 according to the embodiment of FIG. 6. When an adequate scratching force is applied to water-based ink layer 260, water-based ink layer 260 and UV ink layer 270 are scratched off of polymer film layer 240. When water-based ink layer 260 and UV ink layer 270 are scratched off of polymer film layer 240, a contrasting color is revealed below water-based ink layer 260 and UV ink layer 270. Revealing the contrasting color below water-based ink layer 260 and UV ink layer 270 by applying a scratching force allows a user to visibly mark the scratch pad 100 with a sufficiently sharp implement, such as a fingernail or a coin or other sharp object.

Figure 7A:
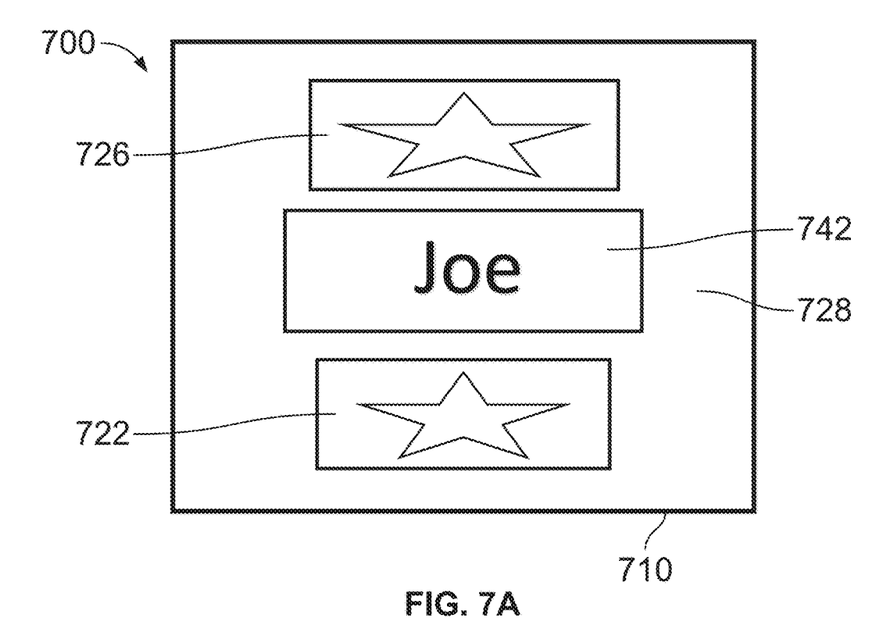
FIG. 7A illustrates a plan view of a scratch pad according to yet another embodiment of the present invention.
Figure 7B:
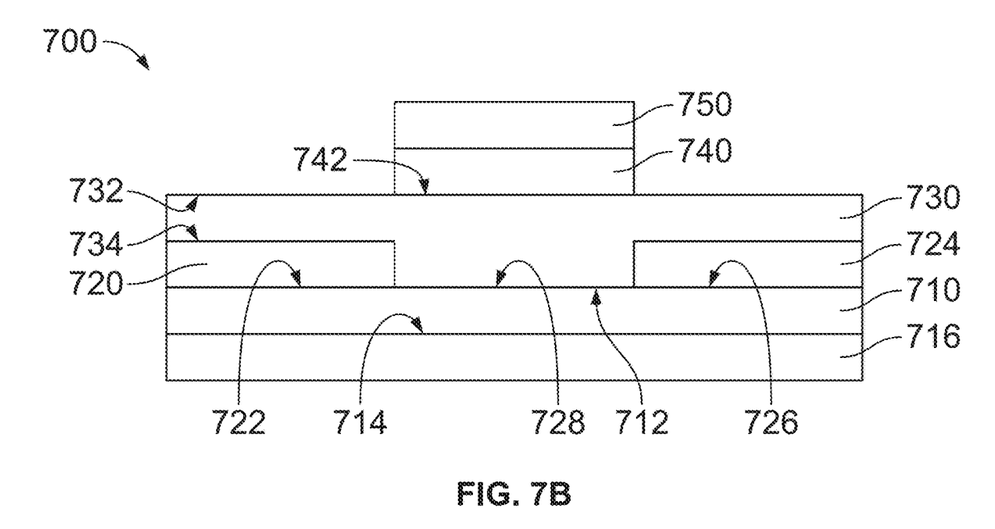
FIG. 7B illustrates a cross-sectional view of the scratch pad of FIG. 7A

FIG. 7A is a plan view of a scratch pad 700 according to another embodiment of the present invention. FIG. 7B shows scratch pad 700 in cross-section. Scratch pad 700 has a first layer 710, comprising a polyester, a polystyrene, or a polypropylene, or combinations thereof. First layer 710 is preferably made of polypropylene, any color, preferably white. The polypropylene may be bi-axially oriented (BOPP), oriented, or non-oriented. First layer 710 is preferably made of bi-axially-oriented polypropylene.

First layer 710 has a top surface 712 and a bottom surface 714. First layer 710 preferably has a backing 716, preferably a paper backing, applied to bottom surface 714. In certain embodiments of the present invention, first layer 710 is comprised of a synthetic polymer material, such as polypropylene, polyester, vinyl, polystyrene or polyolefin. A suitable material for first layer 710 is 2.4 mil white BOPP, available as stock number 79460 from Avery Dennison of Mentor, Ohio. This product is a biaxially-oriented, co-extruded polypropylene film with good opacity and a bright white pearlescent background, with a clear, general purpose permanent acrylic adhesive applied to bottom surface 714 and a bleached glassine white liner. In some embodiments, first layer 710 is a product to which scratch label 700 is applied. For example, first layer 710 may be a bottle, can, or any other food or beverage container. In these embodiments, top surface 712 is the outside of the bottle, can, or other container and bottom surface 714 is the inside of the bottle, can, or other container.

A first ink layer 720 is applied to a first graphics area 722 of top surface 712. A second ink layer 724 is optionally applied to a second graphics area 726 of top surface 712. The application of inks to first graphics area 722 and second graphics area 726 will optionally leave a third graphics area 728 of top surface 712 with no ink applied. First ink layer 720 and second ink layer 724 comprise graphics for scratch pad 700 and are preferably different colors, most preferably contrasting colors. Graphics may comprise images, logos, letters and/or numbers, or any other information. In one example, first ink layer 720 is red and second ink layer 724 is black. Top surface 712 will therefore, in this example, be partially red (first graphics area 722), partially black (second graphics area 726), and partially white (third graphics area 728), as shown in FIG. 7A.

The ink for first graphics area 722 and second graphics area 726 may be a water-based or a UV ink. Suitable inks for first graphics area 722 and second graphics area 726 include red (such as Pantone No. 485), available as stock name FILM III, and black, available as stock name PPX90800001, both from Environmental Inks & Coatings Corp. of Morganton, North Carolina.

A laminate layer 730 has a top surface 732 and a bottom surface 734. Bottom surface 734 is adhered to top surface 712 over the two ink layers 720, 724. Laminate layer 730 is preferably translucent polypropylene. In certain embodiments of the present invention, laminate layer 730 is comprised of a synthetic polymer material, such as polypropylene, polyester, vinyl, polystyrene or polyolefin. A suitable laminate is available as product number 100 from ACHEM Industry America, Inc., Monroe, North Carolina.

A water-based ink layer 740 is applied to a scratch area 742 of top surface 732. Scratch area 742 is the area that will be scratched. Water-based ink layer 740 can be any water-based ink and may be any color but is preferably high gloss and is white. A suitable ink is available under stock name AquaKing, available from Sun Chemical of Parsippany-Troy Hills, New Jersey.

A UV white ink layer 750 is applied to scratch area 742, over water-based ink layer 740. A suitable ink is product name LUVAMXX1B4ZC from Environmental Inks & Coatings Corp. of Morganton, North Carolina.

Laminate materials used for laminate layer 730 commonly are sold on rolls. The manufacturers add silicone to keep the laminate material from sticking to itself. The added silicone makes it difficult for ink to adhere to the laminate material. The inventor of the present invention found that, surprisingly, the use of a water-based ink layer and a UV white ink layer resolved this problem.

In certain embodiments of the present invention, first layer 710 is comprised of a synthetic polymer material, such as polypropylene, polyester, vinyl, polystyrene or polyolefin. In another embodiment, first layer 710 comprises a translucent, coated, biaxially-oriented, co-extruded polypropylene film. A suitable material is stock no. 78998, available from Avery Dennison, which has a general purpose permanent acrylic adhesive and a durable polyester liner. In this embodiment, a white UV ink is first applied so that the graphics of scratch pad 700 have a white background.

Upon removal of the backing from bottom surface 714 of first layer 710, scratch pad 700 may be applied to a product, including by way of examples and not by way of limitations, a water bottle, a cup, food or product packaging, or a luggage tag. Alternatively, scratch pad 700 may be manufactured without a backing and may be applied directly to the product.

In use, a user or a server scratches a name, initials, nickname, avatar, or other identifier onto scratch area 742 of scratch pad 700 to identify that particular water bottle with a particular user.

Figure 8:
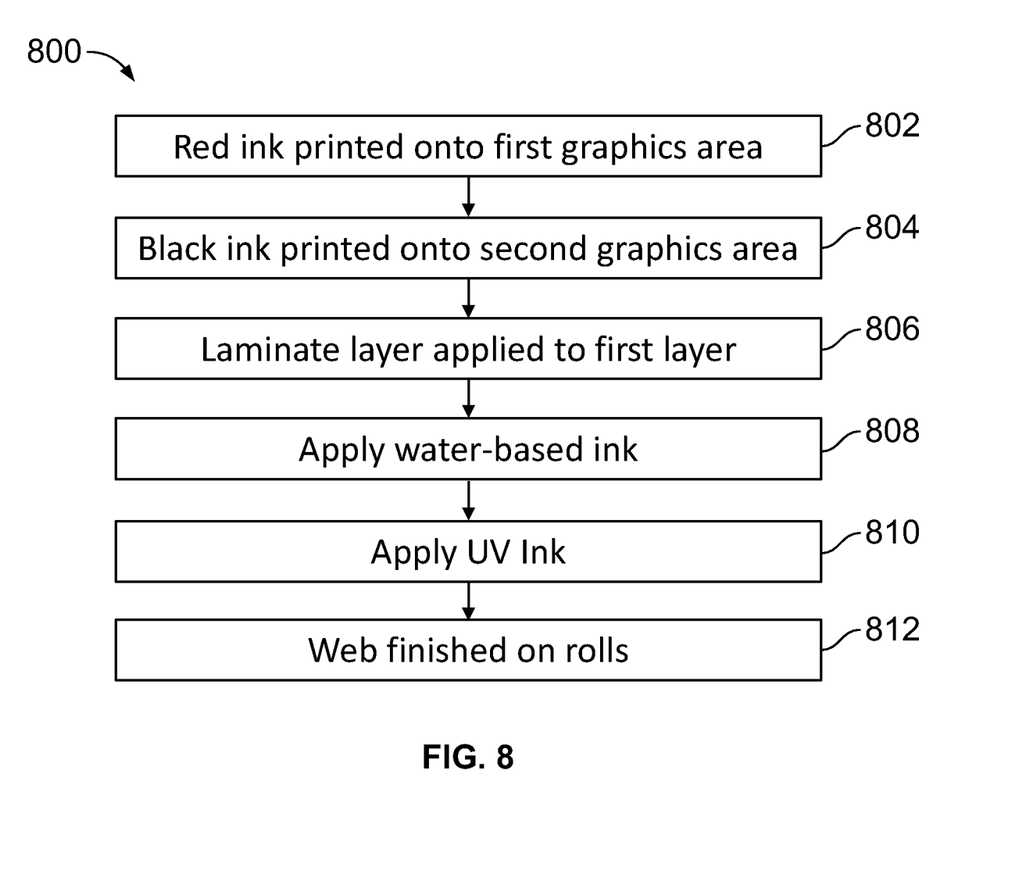
FIG. 8 illustrates a method of manufacture of the scratch pad of FIG. 7B.

A method 800 of manufacture of scratch pad 700 is shown in FIG. 8. This method will be described for red ink and white ink, but any color of ink may be used. Method 800 is described for use on a flexographic printer using anilox rollers to print onto a web, but other printing processes may be used. In this example, first layer 710 comprises the web of the flexographic printer, top surface 712 comprises the top surface of the web, and bottom surface 714 comprises the bottom surface of the web.

In a first step 802, red ink is printed onto first graphics area 722 of top surface 712 of first layer 710.

In a second step 804, black ink is printed onto second graphics area 726 of top surface 712 of first layer 710.

In a third step 806, laminate layer 730 is applied to top surface 712, over ink layers 720, 722.

In a fourth step 808, water-based white ink layer 740 is applied to scratch area 742 of top surface 732 of laminate layer 730.

In a fifth step 810, UV white ink layer 750 is applied to scratch area 742, over water-based ink layer 740.

In a sixth step 812, the web is finished on rolls over cardboard cores.

In another embodiment, a preliminary step comprises initially printing a water-based ink or a white UV ink onto the web.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

I claim:

1. A scratch-off marking pad comprising:
   a first layer comprising a polymer film;
   a second layer comprising a release coating, the release coating having a low surface energy and the second layer being in direct contact with the first layer;
   a third layer comprising an opaque water-based ink, the third layer being in direct contact with the second layer; and
   a fourth layer comprising an opaque ultraviolet (UV) light-cured water-resistant ink, the fourth layer being in direct contact with the third layer,
   where the color of the first layer is contrasting to the combined color of the third layer and the fourth layer,
   where the third layer and the fourth layer are strongly adhered to one another, and
   where the adhesion between the first layer and the third layer is weak enough such that a scratching force applied to the fourth layer will remove a portion of the third layer and a portion of the fourth layer to expose a portion of the first layer, the exposed portion having a visible shape that follows the shape of the scratching force.

2. The scratch-off marking pad of claim 1, where the polymer film comprises a polyester.

3. The scratch-off marking pad of claim 1, where the polymer film comprises a polystyrene.

4. The scratch-off marking pad of claim 1, where the polymer film comprises a polypropylene.

5. The scratch-off marking pad of claim 1, where the polymer film comprises a vinyl.

6. The scratch-off marking pad of claim 1, where the polymer film comprises a polyolefin.

7. The scratch-off marking pad of claim 1, where the polymer film comprises a thermoplastic polymer.

8. The scratch-off marking pad of claim 1, where the second layer comprises a silicone compound.

9. The scratch-off marking pad of claim 1, where the second layer comprises a surfactant.

10. The scratch-off marking pad of claim 1, where the second layer comprises a wax.

11. A scratch-off marking pad comprising:
    a first layer comprising an adhesive bottom surface, a silicone upper surface, and a polymer film, the polymer film positioned between the bottom surface and the upper surface;

a second layer comprising an opaque water-based ink, the second layer being in direct contact with the upper surface of the first layer; and a third layer comprising an opaque ultraviolet (UV) light-cured water resistant ink, the third layer being in direct contact with the second layer, where the color of the polymer film is contrasting to the combined color of the opaque water-based ink and the UV light-cured water resistant ink, where the second layer and the third layer are strongly adhered to one another, and where the adhesion between the polymer film and the third layer is weak enough such that a scratching force applied to the third layer will remove a portion of the second layer and a portion of the third layer to expose a portion of the polymer film, the exposed portion having a visible shape that follows the shape of the scratching force.

12. The scratch-off marking pad of claim 11, where the polymer film comprises a polyester.

13. The scratch-off marking pad of claim 11, where the polymer film comprises a polystyrene.

14. The scratch-off marking pad of claim 11, where the polymer film comprises a polypropylene.

15. The scratch-off marking pad of claim 11, where the polymer film comprises a vinyl.

16. The scratch-off marking pad of claim 11, where the polymer film comprises a polyolefin.

17. The scratch-off marking pad of claim 11, where the polymer film comprises a thermoplastic polymer.

18. A scratch-off marking pad comprising:
a first layer comprising an outside surface of a container;
a second layer comprising a release coating having a low surface energy, the second layer being in direct contact with the first layer;
a third layer comprising an opaque water-based ink, the third layer being in direct contact with the second layer; and
a fourth layer comprising an opaque ultraviolet (UV) light-cured water-resistant ink, the fourth layer being in direct contact with the third layer, where the color of the first layer is contrasting to the combined color of the third layer and the fourth layer, where the third layer and the fourth layer are strongly adhered to one another, and where the adhesion between the first layer and the third layer is weak enough such that a scratching force applied to the fourth layer will remove a portion of the third layer and a portion of the fourth layer to expose a portion of the first layer, the exposed portion having a visible shape that follows the shape of the scratching force.

19. The scratch-off marking pad of claim 18, where the container is made of glass.

20. The scratch-off marking pad of claim 18, where the container is made of aluminum.

21. The scratch-off marking pad of claim 18, where the container is made of plastic.

22. The scratch-off marking pad of claim 18, where the second layer comprises a silicone compound.

23. The scratch-off marking pad of claim 18, where the second layer comprises a surfactant.

24. The scratch-off marking pad of claim 18, where the second layer comprises a wax.

* * * * *